(12) United States Patent
Carlson

(10) Patent No.: US 6,252,767 B1
(45) Date of Patent: Jun. 26, 2001

(54) LOW IMPEDANCE HINGE FOR NOTEBOOK COMPUTER

(75) Inventor: Russell W Carlson, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/338,157

(22) Filed: Jun. 22, 1999

(51) Int. Cl.⁷ .................................................. G06F 3/147
(52) U.S. Cl. .......................... 361/683; 361/726; 361/759; 312/216; 292/148
(58) Field of Search .................................... 361/683, 681, 361/729, 724–727, 686, 740, 759; 364/708.1; 248/551–553; 312/216, 218; 70/57, 58, 85; 292/42, 148, 151, 307 R

(56) References Cited

U.S. PATENT DOCUMENTS

| | | | |
|---|---|---|---|
| 4,959,887 | * 10/1990 | Gruenberg et al. | 364/708 |
| 5,173,837 | 12/1992 | Blackwell et al. | 361/380 |
| 5,237,488 | * 8/1993 | Moser et al. | 361/729 |
| 6,028,764 | * 2/2000 | Richardson et al. | 361/681 |

* cited by examiner

*Primary Examiner*—Leo P. Picard
*Assistant Examiner*—Hung Van Duong

(57) ABSTRACT

A capacitor is formed at a hinge between a display compartment and a microcomputer compartment to reduce EMI emissions caused by the display/microcomputer interface. A plane structure is formed along the length of the display compartment, and another plane structure is formed along the length of the microcomputer compartment. The display compartment's plane structure serves as the ground connection for the display device. It connects to the plane structure of the microcomputer compartment through a capacitative structure. The two plane structures and the capacitative structure form the return path for coupling the display device to a common, system ground. The hinge has as one circular structure concentrically surrounding and in close proximity to another circular structure. The capacitor is formed by the arc area where the two circular structures overlap concentrically, having low impedance at high frequencies (e.g., 30 MHz and above).

13 Claims, 3 Drawing Sheets

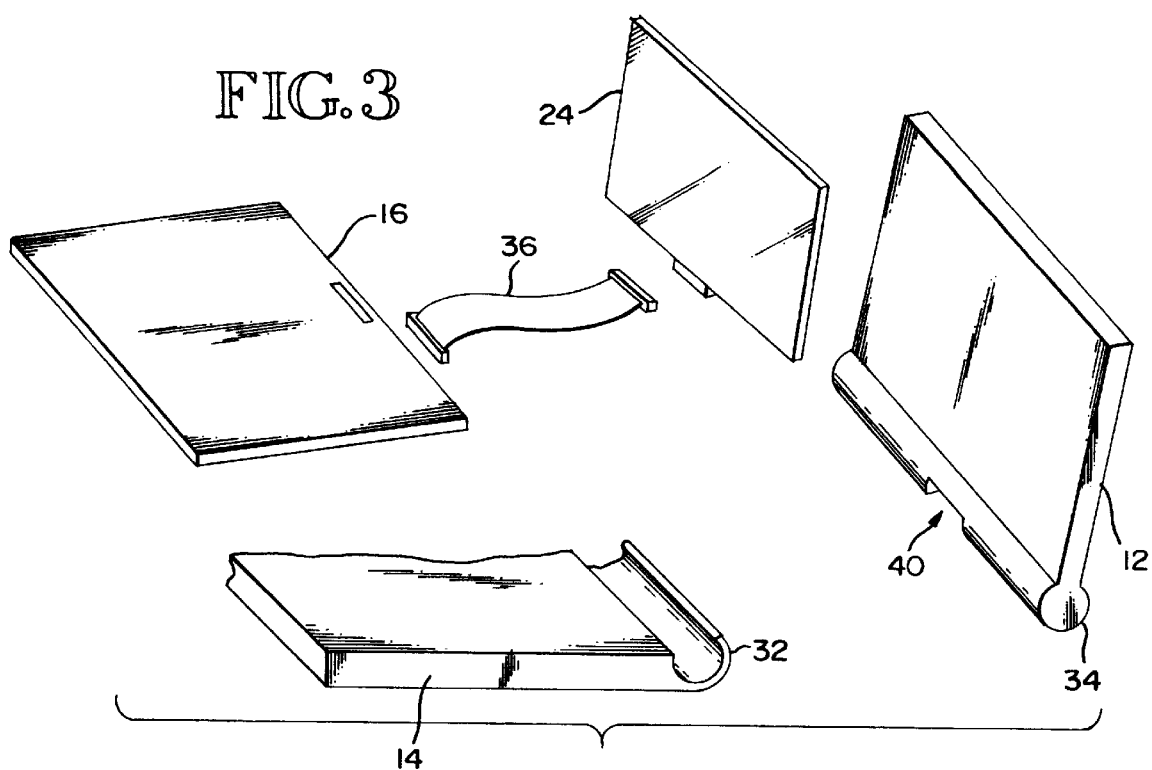
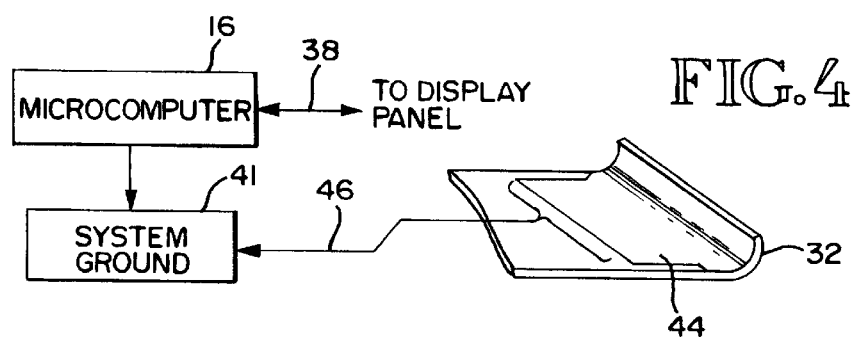
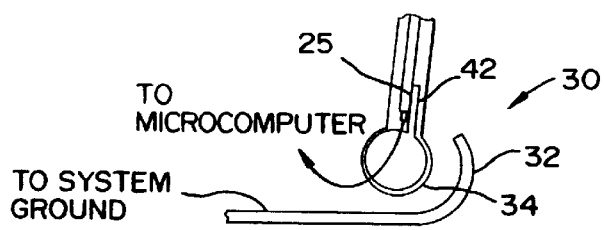

FIG. 6
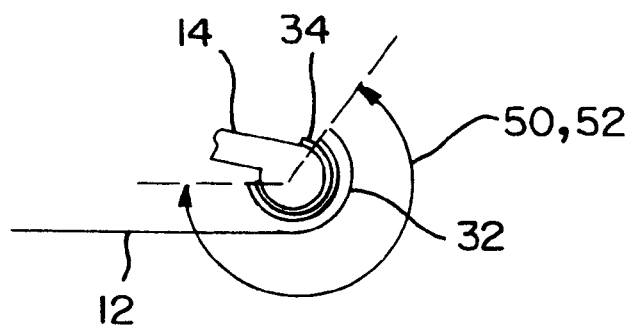
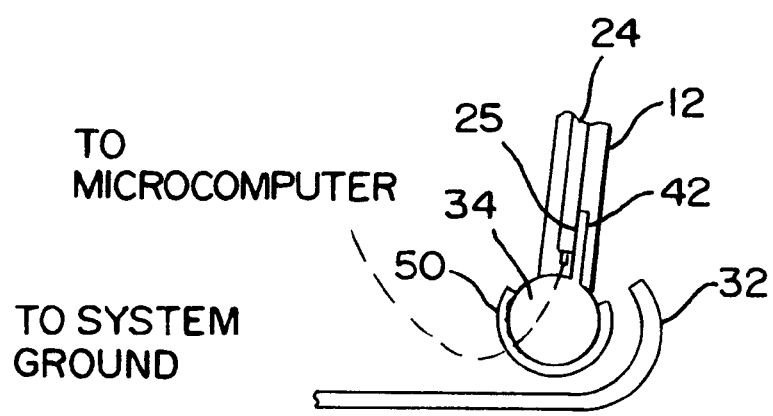
FIG. 7

LOW IMPEDANCE HINGE FOR NOTEBOOK COMPUTER

BACKGROUND OF THE INVENTION

This invention relates generally to display-hinged portable computers, such as notebook computers and hand-held computers, and more particularly, to hinge devices for attaching a display compartment to a microcomputer compartment.

A portable computer is a popular computer configuration enabling increased mobility for a user. Typically, a processor board, display and keyboard are integrated into a case having one or more compartments. A notebook computer typically includes a display compartment and a microcomputer compartment permanently attached in a hinged relationship. A flat panel display is mounted within the display compartment. A keyboard, microcomputer, data storage unit (s), expansion slot(s), and I/O ports are mounted in the microcomputer compartment. Modular peripheral units such as a floppy drive, hard drive, CD-ROM drive and modem or other PC card are readily installed and removed from the microcomputer compartment.

Electromagnetic interference is electromagnetic energy emitted from electronic devices which, either directly or indirectly, contributes to a degradation in performance of an electronic receiver or other electronic system. Poorly shielded electronic devices, for example, degrade radio and television signals resulting in audible or visible static at receivers picking up such signals, or cause other malfunctions of electronic equipment. Governments typically regulate EMI emissions to enhance public use of the radio wave spectrum and other electromagnetic wave spectrums. In the United States, for example, the Federal Communications Commission requires testing of devices and rates the devices by class according to their emissions. The Federal Communication Commission rates EMI emissions over a 120 kilohertz bandwidth. The 120 kHz bandwidth corresponds to the typical bandwidth of a conventional communication receiver, such as an FM receiver. Reduced EMI emissions within such bandwidth reduce the interference output perceived by a listener or viewer as, for example, static, white noise, or "ghosts."

Typical precautions taken by electronic manufacturers are to provide shielding of electronic devices to minimize EMI emissions. Computer manufacturers, for example, typically use shielded cables and shielded housings to minimize EMI emissions.

In a display-hinged portable computer there are conductive paths from the microcomputer compartment to the display compartment and a return path from the display compartment to the microcomputer compartment. The conductive paths are to carry power and data to or from the display device. The return path is to couple the display to a system ground, rather than have a display ground which is floating relative to the system ground. To leave the display "floating" could result in a larger voltage differential and more electromagnetic radiation. By coupling the display to a common electrical ground plane with the microcomputer and other computer modules, EMI emissions are reduced.

Conventionally, a ground wire or wire braid is used to form a return path for a display compartment. Such wires have had limited success in reducing EMI emissions. In particular, the wires form a non-zero impedance electrical connection between the display and system ground. The resulting voltage drop at high frequencies across such non-zero impedance causes undesirable EMI emissions. Such voltage drop acts as a voltage source which drives the display relative to the microcomputer, much like two elements in a dipole antenna. The result, for example, can be a vertically polarized EMI emission that fails to comply with regulatory emissions standards. Accordingly, complying with standards for EMI emissions in notebook computers is a continuing challenge.

SUMMARY OF THE INVENTION

According to the invention, a capacitor is formed at a hinge between a display compartment and a microcomputer compartment to reduce electromagnetic interference (EMI) emissions attributable to the display/microcomputer interface.

According to one aspect of the invention, a plane structure is formed along the length of the display compartment. Another plane structure is formed along the length of the microcomputer compartment. The display compartment is referred to herein as having a length, a height and a thickness. The microcomputer compartment is referred to as having a length, a width and a thickness. The length typically is the longest dimension.

According to another aspect of the invention, the display compartment's plane structure serves as the ground connection for the display device. It connects to the plane structure of the microcomputer compartment through a capacitative structure. The two plane structures and the capacitative structure form the return path for coupling the display device to a common, system ground.

According to another aspect of the invention, the capacitative structure is of a cylindrical shape extending the length of the display and microcomputer compartments. The cylinder has a diameter which is approximately the combined thickness of the display compartment and microcomputer compartment. Smaller diameters also may be used. Further, the capacitative structure has very low impedance at high frequencies of interest, (e.g., 30 MHz and above).

According to another aspect of the invention, the capacitor is formed by the hinge between the display compartment and the microcomputer compartment. In cross section the hinge appears as one circular structure concentrically surrounding and in close proximity to another circular structure. Contact between the two circular structures is allowed, but not necessary. Even where contact is allowed, the structure serves as a shorted capacitor. Further, at the high frequencies, the structure has low impedance. Where contact is not prescribed, an air gap or another dielectric material is situated between the two circular structures.

To open the display compartment one circular structure rotates relative to the other circular structure. In doing so, the two circular structures are concentric for only a portion (i.e., arc) of the circumference of the respective circular structures. The capacitor occurs in the arc area where the two circular structures overlap concentrically.

One advantage of the invention is that a low impedance return path is provided between a display compartment and a microcomputer compartment at high frequencies (e.g., 30 MHz and above). The result is reduced EMI emissions at pertinent frequencies. These and other aspects and advantages of the invention will be better understood by reference to the following detailed description taken in conjunction with the accompanying drawings.

BRIEF DESCRIPTION OF THE DRAWINGS

FIG. 3 is an exploded view of the portable computer of FIG. 1;

FIG. 4 is a partial block diagram of the computer of FIG. 1 showing the system ground connection for the microcomputer and low impedance hinge;

FIG. 5 is a diagram of the electrical connections to the low impedance hinge of FIG. 1;

FIG. 6 is a diagram of the capacitative structure formed by the hinge; and

FIG. 7 is a diagram of another embodiment of the capacitative structure formed by the hinge.

DESCRIPTION OF SPECIFIC EMBODIMENTS

Figure 1:
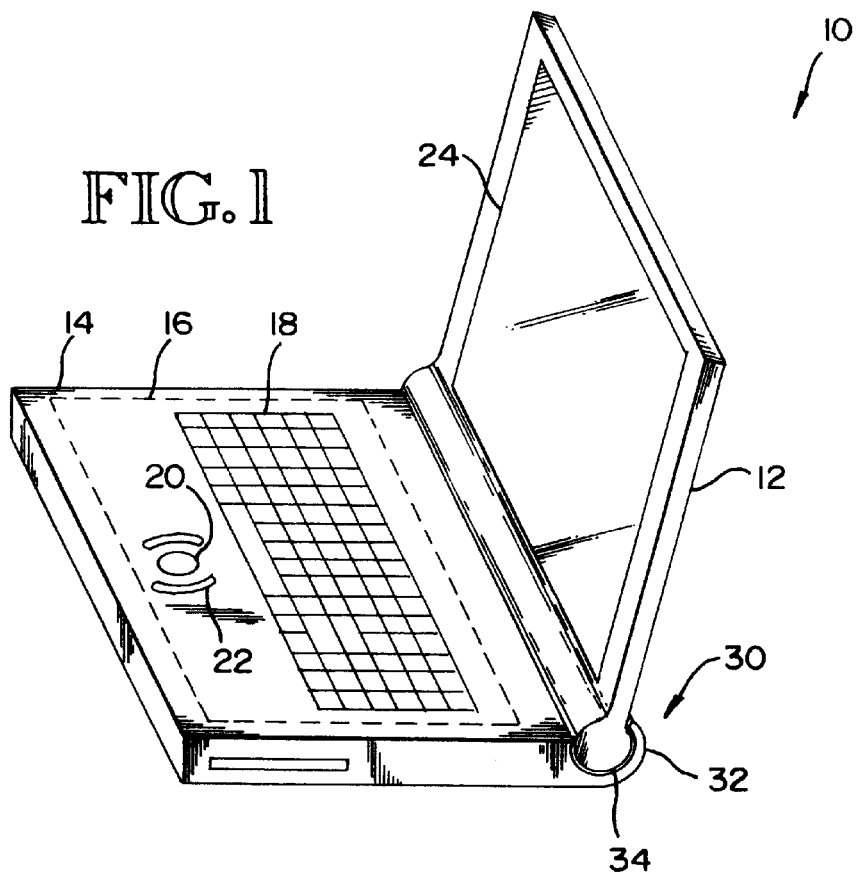
FIG. 1 is a perspective view of a portable computer having a low impedance hinge according to an embodiment of this invention.
Figure 2:
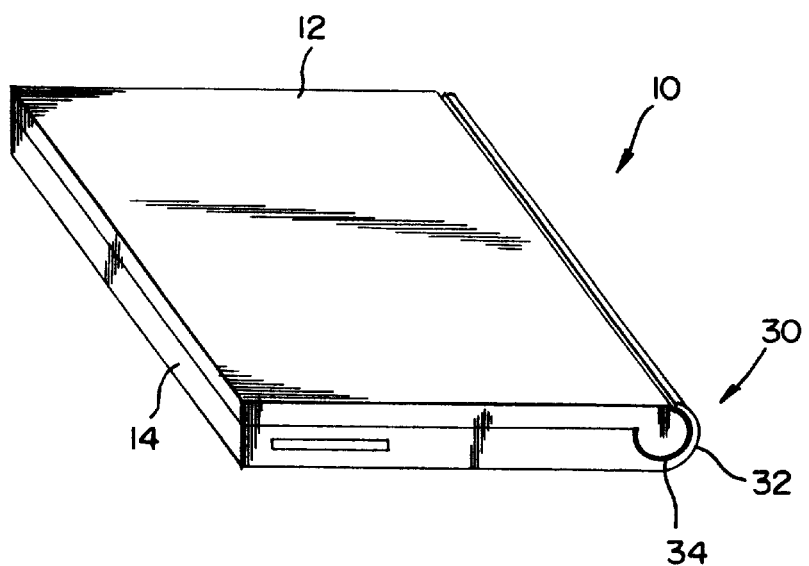
FIG. 2 is a perspective view of the portable computer of FIG. 1 with the display compartment in a closed position.

Referring to FIGS. 1 and 2, a portable notebook computer 10 according to an embodiment of this invention includes a display compartment 12 hinged to a microcomputer compartment 14. The display compartment 12 houses a display panel 24. The microcomputer compartment houses a microcomputer 16, a keyboard 18, pointing device 20, clicking device 22 and various modular components. The microcomputer 16 includes a main processing unit and memory, and receives inputs from the keyboard 18, pointing device 20, clicking device 22, and a network interface or another input device or input port. The microcomputer 16 generates outputs to the display panel 24, the modular components, and various peripheral devices or other computers through a system of busses and various interfaces and ports.

The modular components and peripherals may include a non-volatile storage medium (e.g., hard disk drive), a transportable storage media drive, (e.g., a floppy disk drive, CD-ROM drive, zip drive, bernoulli drive or other magnetic, optical or other storage media), and a communication or network interface (e.g., modem; ethernet adapter). In addition one or more PC cards embodying a modem or other peripheral device conforming to the Personal Computer Memory Card International Association standards are included in some embodiments.

A hinge 30 connects the display compartment 12 and microcomputer compartment 14. FIG. 1 shows the hinge 30 in an open position exposing the display panel 24 for viewing. FIG. 2 shows the hinge 30 in a closed position, in which the display compartment 12 typically is locked to the microcomputer compartment 14. In a preferred embodiment the hinge 30 is formed by concentric cylindrical bodies 32, 34. A first generally cylindrical body 32 concentrically surrounds the second generally cylindrical body 34. In one embodiment the first cylindrical body 32 is integral to the microcomputer compartment 14 and the second cylindrical body 34 is integral to the display compartment. In other embodiments either of both of the cylindrical bodies 32, 34 are separately formed and attached to the respective compartments 14, 12. Although, the body 34 attached to the display compartment 12 is shown to be inner to the other cylindrical body 32, in other embodiments the body 34 attached to the display compartment 12 may concentrically surround the body 34 attached to the microcomputer compartment 14.

In a preferred embodiment the first cylindrical body 32 is a conductive sheet fitted to the microcomputer compartment 14 housing. Thus, the body 32 generally is not exposed to the user's touch. Further, the second cylindrical body 34 also is a conductive sheet fitted to a cylindrical edge of the display compartment 12. Although a sheet of conductive material is preferred (due to the more desirable electrical qualities obtained) the conductive material may be otherwise applied to the housing, such as by a plating or coating process.

The circumferential arc of the first cylindrical body 32 generally is less than 360° and serves as a stop for the display compartment. As the display compartment 12 is moved to manipulate the computer 10 into an open position, the display compartment 12 is rotated at the hinge 30 relative to the microcomputer compartment 14. In doing so, the second cylindrical body rotates relative to the first cylindrical body 32. At some point during the rotation the further rotation is stopped as the display compartment 12 bumps into the first cylindrical body 32. Such position corresponds to the open-most position of the display compartment 12. Preferably there is sufficient friction between the first cylindrical body 32 and the second cylindrical body 34 to allow relative rotation, yet also allow the display compartment 12 to be held in an open position which is less open than the open-most position. In other embodiments a clutch mechanism or other device is included to hold the display compartment 12 in any of various open positions relative to the microcomputer compartment 14.

Referring to FIG. 3, an exploded view reveals a wire ribbon connection 36 between the microcomputer 16 and display panel 24. Such wire ribbon connection forms a conductive path 38 (see FIG. 4) for carrying electrical signals between the microcomputer 16 and display panel 24. Carried from the microcomputer 16 to the display panel 24 are a power signal and one or more data and control signals. Carried back from the display panel 24 to the microcomputer 16 are one or more data and control signals. The second cylindrical body 34 includes an opening 40 which spans a portion of the body 34 length sufficient to fit the wire ribbon connection 36. The opening extends along a portion of the circumferential arc of the second cylindrical body 34. The extent of the arc opening 40 is sufficient to allow the display compartment 12 and second cylindrical body 34 to rotate relative to the microcomputer compartment 14 and first cylindrical body 32 by an amount sufficient to open and close the display without sheering the wire ribbon connection 36. In a specific embodiment the opening extends an arc of approximately 130° (e.g., the angle that the display compartment 12 forms relative to the microcomputer compartment 14 in the open-most position.) Preferably, the opening 40 occurs toward the center of the cylindrical body 34 relative to the length of such body 34, although the opening instead may occur at other positions along the length of body 34.

In addition to the conductive paths 38 formed by the wire ribbon connection 36 there also is a return path which couples the display panel ground to a common system ground 41. More specifically the display panel 24 is grounded to the same ground plane (i.e., electrical plane) as the microcomputer 16. The display panel 24 ground path is coupled to a planar structure 42 (FIG. 5), which preferably extends the length of the second cylindrical body 34. In one embodiment the planar structure 42 is integrally formed with the second cylindrical body 34. In some embodiments the planar structure 42 is a part of the display compartment 12 housing. A ground contact 25 of the display panel 24 defines the display ground path and connects to the planar structure 42. The ground contact includes in various embodiments either many point contacts or elongated along the length of the display panel, or one generally continuous contact extending approximately the length of the display panel 24 and planar structure 42.

The planar structure 42 is in physical communication with the second cylindrical body 34. The second cylindrical body 34 is in electrical communication with the first cylindrical body 32, either by direct contact or across an air gap or other dielectric material. In either case, the first cylindrical body 32 and second cylindrical body 34 together define a capacitative structure. Even when in direct contact, at the frequencies being considered, the inability to have a precise fully continuous contact between two surface means that the structure will act as a capacitor as the frequency range of interest, (e.g., 30 MHz and up). The upper limit of the frequency range at which the structure operates as a capacitor is related to the contacts and connections occurring along the return path, (e.g., from display panel 24 to planar structure 42; from planar structure 42 to cylindrical body 34; from cylindrical body 34 to cylindrical body 32; from cylindrical body 32 to planar structure 44 (see FIG. 4), and from planar structure 44 to the system ground plane.)

Referring to FIG. 4, the planar structure 44 extends from the first cylindrical body 32 at the microcomputer compartment 14. In one embodiment the planar structure 44 is integrally formed with the first cylindrical body 32. In some embodiments the planar structure 44 is an integral part of the microcomputer compartment 14 housing (e.g., applied as a sheet or a coating or plating). A conductive path 46 electrically interfaces the planar structure 44 to the common system ground 41. Preferably a connection is made along substantially the full length of the planar structure 44, such as by intimate contact with the ground plane of the pc board of the microcomputer 16. Alternatively multiple point connections or elongated connections may be used to form conductive path 46. As discussed above the better the connection between the planar structure 44 and the system ground 41, the lower the impedance of the display/microcomputer interface. In particular, the better the connection, the higher the frequency before the interface exhibits inductance qualities and thus higher impedance. In a preferred embodiment, connections are established of a quality sufficient to provide a low impedance interface from 30 MHz up to at least 1 GHz. (Generally, these frequencies are the limits set in the United States corresponding to a certain standard for radiated electromagnetic interference emissions). Although the specific desired impedance will vary based upon physical dimensions and materials, an impedance less than 1 ohm is preferred throughout the frequency range. Specifically, the connection is to act like a capacitor and decrease as frequency increases within the desired frequency range. In one specific embodiment a connection having an impedance of 0.7 ohms at 30 MHz is achieved. In such example, such impedance decreases to 0.02 ohms at 1 GHz. Contrast this low impedance connection to a conventional wire connection used for a return path. The conventional wire return acts as an inductor and typically increases in impedance over the frequency range of interest (e.g., 30 MHz to 1 GHz).

The return path for the display goes from the display panel 24 through the planar structure 42, the capacitative structure, the planar structure 44, and along the conductive path 48 to the system ground 41.

FIG. 6 shows the capacitative structure 50 formed by the hinge 30. More specifically the capacitative structure 50 is formed by the overlapping portions of the first cylindrical body 32 and second cylindrical body 34. Preferably the overlapping arc 52 is at least 135°. In a best mode embodiment at least a portion of the capacitative structure 50 extends the length of the first cylindrical body 32 and second cylindrical body 34. Preferably the capacitative structure 50 is formed over at least one-third the length of the first cylindrical body 32 and second cylindrical body 34.

In one embodiment the first generally cylindrical body 32 and second generally cylindrical body 34 are formed to be in close contact. In such embodiment the bodies 32, 34 preferably are formed by conventional electronic contact materials, such as a beryllium copper alloy or an alloy including nickel, copper or silver. Such materials are selected not only for their electrical properties, but also for their wear, as they shall be moving relative to each other during the opening and the closing of the display compartment 12. If at the atomic level the cylindrical bodies 32, 34 were in contact over their entire surface, the friction would be too great to open and close the display. Instead there are areas of point contact and other areas of non-contact. However, over the frequency range of interest (e.g., 30 MHz to 1 Ghz), the capacitative structure 50 has low impedance.

FIG. 7 shows an alternative embodiment a dielectric material 50 occurs between the two conductive bodies 32, 34. In one embodiment the dielectric material is an air gap. In such embodiment a clutch mechanism also is included for holding the display compartment in place at various open positions. In another embodiment a solid material, such as mylar is included as the dielectric. Other conventional dielectric materials also may be used. In such embodiments, any conductive material may be used for the cylindrical bodies 32, 34. The dielectric and conductive materials should also be selected to resist corrosion as they may be exposed to moisture (e.g., from the touch of the user).

Meritorious and Advantageous Effects

One advantage of the invention is that a low impedance return path is provided between a display compartment and a microcomputer compartment at high frequencies (e.g., 30 MHz and above). The result is reduced EMI emissions at pertinent frequencies.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a capacitative structure extending longitudinally relative to the display compartment and microcomputer compartment for a third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface;

in which the first interface is planar having a length approximating the third length and having a width extending away from the hinge.

2. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a capacitative structure extending longitudinally relative to the display compartment and microcomputer compartment for a third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface;

in which the second interface is planar having a length approximating the third length and having a width extending away from the hinge.

3. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a first, generally cylindrical structure and a second generally cylindrical structure, the first generally cylindrical structure concentrically surrounding the second generally cylindrical structure over at least a portion of a circumference of the second cylindrical structure to form an overlapping arc, said overlapping arc defining a capacitative structure, the capacitative structure extending longitudinally relative to the display compartment and microcomputer compartment for a third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface;

in which the capacitative structure is of low impedance at frequencies at least as high as 30 MHz.

4. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a first, generally cylindrical structure and a second generally cylindrical structure, the first generally cylindrical structure concentrically surrounding the second generally cylindrical structure over at least a portion of a circumference of the second cylindrical structure to form an overlapping arc, said overlapping arc defining a capacitative structure, the capacitative structure extending longitudinally relative to the display compartment and microcomputer compartment for a third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface;

in which the capacitative structure further comprises a dielectric between the first generally cylindrical structure and a second generally cylindrical structure.

5. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a first, generally cylindrical structure and a second generally cylindrical structure, the first generally cylindrical structure concentrically surrounding the second generally cylindrical structure over at least a portion of a circumference of the second cylindrical structure to form an overlapping arc, said overlapping arc defining a capacitative structure, the capacitative structure extending longitudinally relative to the display compartment and microcomputer compartment for a third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface;

in which the third length extends approximately the first length; and in which the first interface is planar having a length approximating the third length and having a width extending away from the hinge.

6. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a first, generally cylindrical structure and a second generally cylindrical structure, the first generally cylindrical structure concentrically surrounding the second generally cylindrical structure over at least a portion of a circumference of the second cylindrical structure to form an overlapping arc, said overlapping arc defining a capacitative structure, the capacitative structure extending longitudinally relative to the display compartment and microcomputer compartment for at third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface;

in which the third length extends approximately the first length; and in which the second interface is planar having a length approximating the third length and having a width extending away from the hinge.

7. A portable computing apparatus, comprising:

a microcomputer compartment having a microcomputer, a first conductive path, a system ground and a first interface, the microcomputer having a first length;

a display compartment attached to the microcomputer compartment, the display compartment having a display panel, a second conductive path, a ground path and a second interface, the display compartment having a second length approximating the first length; and a hinge coupling the display compartment to the microcomputer compartment, the hinge enabling the display compartment to rotate relative to the microcomputer compartment between an open position for viewing the display panel and a closed position at which the display panel is held to the microcomputer compartment, the hinge comprising a capacitative structure extending longitudinally relative to the display compartment and microcomputer compartment for a third length which is at least one-third the first length, the first interface and the second interface being connected to the capacitative structure;

wherein the first conductive path is electrically coupled to the second conductive path;

wherein the ground path is electrically coupled to the system ground through the second interface, capacitative structure and first interface; and wherein the capacitative structure is of low impedance over a frequency range between 30 MHz and 1 GHz.

8. The portable computing apparatus of claim 7, in which the first interface extends approximately the length of the capacitative structure and in which the second interface extends approximately the length of the capacitative structure.

9. The portable computing apparatus of claim 7, in which the third length extends approximately the first length.

10. The portable computing apparatus of claim 7, in which the first interface is planar having a length approximating the third length and having a width extending away from the hinge.

11. The portable computing apparatus of claim 7, in which the second interface is planar having a length approximating the third length and having a width extending away from the hinge.

12. A method for reducing electromagnetic interference emissions attributable to an interface between a display compartment and a microcomputer compartment of a portable computing apparatus, the microcomputer compartment having a microcomputer, a first conductive path, a system ground and a first interface, the microcomputer having a first length, the display compartment attached to the microcomputer compartment, the display compartment having a display panel, a second conductive path, a ground path and a second interface, the display compartment having a second length approximating the first length, the display compartment being attached to the microcomputer compartment by a hinge, the hinge enabling the display compartment to rotate relative to the microcomputer compartment between an open position for viewing the display panel and a closed position at which the display panel is held to the microcomputer compartment, the hinge including a first, generally cylindrical structure and a second generally cylindrical structure, the first generally cylindrical structure concentrically surrounding the second generally cylindrical structure over at least a portion of a circumference of the second cylindrical structure, the method comprising:

opening the display compartment relative to the microcomputer compartment during which the hinge first generally cylindrical structure and second generally cylindrical structure form an overlapping arc, said overlapping arc defining a capacitative structure, the capacitative structure extending longitudinally relative to the display compartment and microcomputer compartment for a third length which is at least one-third the first length, the first interface and the second interface being connected to the capacitative structure;

transmitting a display signal from the first conductive path to the second conductive path, wherein the first conductive path is electrically coupled to the second conductive path; and forming a return-to-ground path for the display signal to reduce electromagnetic interference emissions, the return-to-ground path formed between the ground path and the system ground through the second interface, capacitative structure and first interface.

13. The method of claim 12, in which the step of opening the display compartment comprises forming the capacitative structure to be of dimensions defining a low impedance capacitor at frequencies at least as high as 30 MHz.

* * * * *